US012609400B2

(12) United States Patent
Tang et al.

(10) Patent No.: US 12,609,400 B2
(45) Date of Patent: Apr. 21, 2026

(54) BATTERY AND POWER CONSUMING DEVICE

(71) Applicant: CONTEMPORARY AMPEREX TECHNOLOGY (HONG KONG) LIMITED, Hong Kong (CN)

(72) Inventors: Yu Tang, Ningde (CN); Peng Wang, Ningde (CN); Xiayi Wu, Ningde (CN); Xiang Wang, Ningde (CN); Zhenhua Li, Ningde (CN); Xing Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 685 days.

(21) Appl. No.: 18/068,524

(22) Filed: Dec. 20, 2022

(65) Prior Publication Data

US 2023/0121633 A1     Apr. 20, 2023

Related U.S. Application Data

(63) Continuation of application No. PCT/CN2021/106458, filed on Jul. 15, 2021.

(51) Int. Cl.
*H01M 50/271*          (2021.01)
*H01M 50/204*          (2021.01)
(Continued)

(52) U.S. Cl.
CPC ....... *H01M 50/271* (2021.01); *H01M 50/204* (2021.01); *H01M 50/242* (2021.01); *H01M 50/291* (2021.01)

(58) Field of Classification Search
None
See application file for complete search history.

(56) References Cited

U.S. PATENT DOCUMENTS 9,056,631 B2 *  6/2015  Nakamori ........... H01M 50/227
2013/0244084 A1    9/2013  Ahn et al.

FOREIGN PATENT DOCUMENTS

CN          109841770 A      6/2019
CN          209963117 U      1/2020
                (Continued)

OTHER PUBLICATIONS

Machine Translation of CN-111312956-A (Year: 2020).*
                (Continued)

*Primary Examiner* — Gregg Cantelmo
(74) *Attorney, Agent, or Firm* — K&L Gates LLP

(57) ABSTRACT

Embodiments provide a battery and a power consuming device. In some embodiments, the battery includes: a case assembly, including a case and fixed beams fixed in the case; a battery module, arranged in the case and including a plurality of battery cells; a first restraining component, configured to cover the battery module and fixed to the fixed beams; and a second restraining component, located on the side of the first restraining component away from the battery module and fixed to the fixed beams, wherein the second restraining component is provided with a weak area, and the second restraining component is configured to apply a restraining force to the first restraining component and to allow expansion of the battery cells in the weak area.

13 Claims, 5 Drawing Sheets

(51) Int. Cl.
H01M 50/242 (2021.01)
H01M 50/291 (2021.01)

(56) References Cited

FOREIGN PATENT DOCUMENTS

| | | | | | |
|---|---|---|---|---|---|
| CN | 110931672 | A | | 3/2020 | |
| CN | 110998908 | A | | 4/2020 | |
| CN | 111106279 | A | | 5/2020 | |
| CN | 111312956 | A | * | 6/2020 | ........... H01M 50/24 |
| CN | 111554843 | A | | 8/2020 | |
| CN | 111554844 | A | | 8/2020 | |
| CN | 111834564 | A | | 10/2020 | |
| CN | 112151709 | A | | 12/2020 | |
| CN | 112331982 | A | | 2/2021 | |
| EP | 3790070 | A1 | | 3/2021 | |
| JP | 2015185413 | A | | 10/2015 | |
| JP | 2017-076540 | A | | 4/2017 | |
| JP | 2017-147203 | A | | 8/2017 | |
| JP | 2018530890 | A | | 10/2018 | |
| JP | 2019-053827 | A | | 4/2019 | |
| JP | 2020177747 | A | | 10/2020 | |
| JP | 2021521623 | A | | 8/2021 | |
| KR | 20170068261 | A | | 6/2017 | |
| KR | 102033698 | B1 | | 10/2019 | |
| WO | 2020259135 | A1 | | 12/2020 | |
| WO | 2021097644 | A1 | | 5/2021 | |

OTHER PUBLICATIONS

Decision to Grant a Patent received in the corresponding Japanese Application 2022-559606, mailed on Sep. 19, 2023.
International Search Report received in the corresponding International Application PCT/CN2021/106458, mailed Feb. 24, 2022.
Written Opinion received in the corresponding International Application PCT/CN2021/106458, mailed Feb. 24, 2022.
The Request for the Submission of an Opinion received in the counterpart Korean application 10-2022-7035408, mailed on Aug. 30, 2024.
The extended European search report received in the corresponding European Application 21937195.2, mailed on Jan. 2, 2024.
Notice of Grant of Invention Patent Right (with English Machine Translation), mailed Jul. 1, 2025, for corresponding Chinese Patent Application No. 202180068265.3.
Notice of Grant of Invention Patent Right (with English Machine Translation), mailed May 28, 2025, for corresponding Korean Patent Application No. 10-2022-7035408.

* cited by examiner

BATTERY AND POWER CONSUMING DEVICE

CROSS REFERENCE TO RELATED APPLICATIONS

The present application is a continuation of International Application PCT/CN2021/106458, filed Jul. 15, 2021 and entitled "BATTERY AND POWER CONSUMING DEVICE", the entire content of which is incorporated herein by reference.

TECHNICAL FIELD

The present application relates to the technical field of batteries, and more particularly to a battery and a power consuming device.

BACKGROUND ART

Due to the advantages such as high energy density, high power density, many cycles of use, and long storage time, batteries such as lithium ion batteries have been widely used in electric vehicles.

However, how to improve the reliability and prolong the service life of the batteries of the electric vehicles has always been a problem in the industry.

SUMMARY OF THE INVENTION

An objective is to improve the reliability and safety of a battery in operation.

According to a first aspect of the present application, provided is a battery, including:

a case assembly, including a case and fixed beams fixed in the case;

a battery module, arranged in the case and including a plurality of battery cells;

a first restraining component, configured to cover the battery module and fixed to the fixed beams; and a second restraining component, located on the side of the first restraining component away from the battery module and fixed to the fixed beams, wherein the second restraining component is provided with a weak area, and the second restraining component is configured to apply a restraining force to the first restraining component and to allow expansion of the battery cells in the weak area.

In some embodiments, the second restraining component and the first restraining component are stacked with each other.

In some embodiments, the battery cell includes an electrode assembly, and the weak area is arranged corresponding to a region where the electrode assembly is located.

In some embodiments, the weak area is provided in a penetrating manner in a thickness direction of the second restraining component.

In some embodiments, the battery cell has a side surface facing the first restraining component, the side surface having four side edges;

the second restraining component applies a restraining force to the first restraining component on at least some of the side edges of the side surface.

In some embodiments, the first restraining component includes a first limiting portion configured to cover the battery module, and the second restraining component includes a second limiting portion which is stacked on an outer side of the first limiting portion; the battery module includes a plurality of battery cells which are arranged in a first direction, and the four side edges include a second side edge extending in a second direction, which is perpendicular to the first direction within the side surface;

wherein the second limiting portion includes a transverse restraining bar, the transverse restraining bar being configured to apply a restraining force to the second side edge.

In some embodiments, adjacent second side edges of the battery cells adjacent to each other in the first direction are restrained by a restraining force from the same transverse restraining bar.

In some embodiments, the four side edges further include a first side edge extending in the first direction, and the second limiting portion further includes two longitudinal restraining bars arranged apart from each other in the second direction and both extending in the first direction, the longitudinal restraining bars being configured to apply a restraining force to the first side edge, wherein the transverse restraining bar is located between the two longitudinal restraining bars, and two ends of the transverse restraining bar are respectively connected to the two longitudinal restraining bars.

In some embodiments, the second limiting portion includes a plurality of transverse restraining bars, and a region enclosed by adjacent transverse restraining bars and the two longitudinal restraining bars forms the weak area.

In some embodiments, the fixed beams are arranged on two sides of the battery module in the second direction;

the first restraining component includes a first limiting portion and two first mounting portions, the first limiting portion being configured to cover the battery module, and the two first mounting portions being respectively connected to two sides of the first limiting portion in the second direction; and the second restraining component includes a second limiting portion and two second mounting portions, the second limiting portion being stacked on an outer side of the first limiting portion, and the two second mounting portions being respectively connected to two sides of the second limiting portion in the second direction;

wherein the first limiting portion and the second limiting portion on the same side are fixed to the same fixed beam.

In some embodiments, the first limiting portion as a whole protrudes toward the side away from the battery module relative to the first mounting portions, and the second limiting portion as a whole protrudes toward the side away from the battery module relative to the second mounting portions.

In some embodiments, the battery further includes:

an outer cover arranged on the side of the second restraining component away from the first restraining component, and configured to close an opening end of the case.

According to a second aspect of the present application, provided is a power consuming device, including a battery according to the foregoing embodiments, wherein the battery is configured to supply electric energy to the power consuming device.

In the battery according to some embodiments of the present application, the second restraining component is arranged outside the first restraining component, and the second restraining component can be used to apply a restraining force to the first restraining component, so that the first restraining component and the second restraining component can be jointly used to apply a restraining force to the battery module; moreover, the second restraining component is provided with the weak area, and on the basis that expansion of the battery cells is allowed in the weak area, a restraining force to an expansion surface of each battery cell can be increased, so that an expansion rate of the battery cell is increased, and the probability of battery failure caused by squeezing a structural member of the battery after expansion of the battery cell is reduced, thereby improving the reliability and prolonging the service life of the battery in operation.

BRIEF DESCRIPTION OF THE DRAWINGS

In order to more clearly illustrate the technical solutions of some embodiments of the present application, the drawings to be used in the description of some embodiments of the present application will be described briefly below. Obviously, the drawings in the following description are merely some embodiments of the present application. For those skilled in the art, other drawings can also be obtained according to these drawings without any creative effort.

DETAILED DESCRIPTION OF EMBODIMENTS

Figure 1:
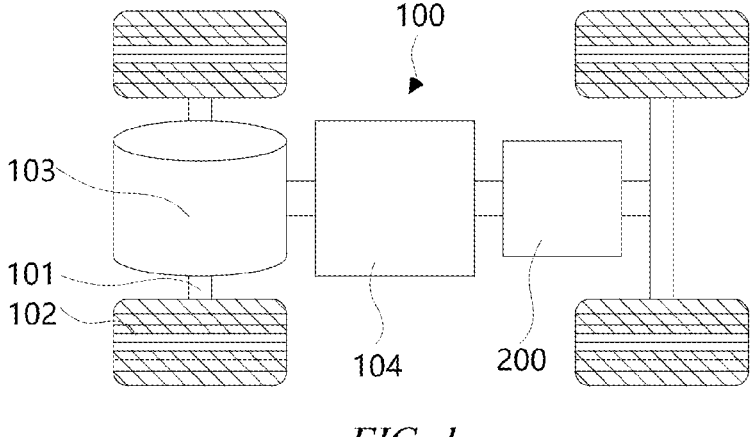
FIG. 1 is a schematic structural diagram of a battery mounted to a vehicle according to some embodiments of the present application.

The following further describes in detail implementations of the present application with reference to the accompanying drawings and embodiments. The detailed description of the following embodiments and the drawings are used to illustrate the principle of the present application by way of example, but shall not be used to limit the scope of the present application. In other words, the present application is not limited to the described embodiments.

In the description of the present application, it should be noted that, unless otherwise specified, "a plurality of" means at least two. An orientation or a position relationship indicated by the terms "upper", "lower", "left", "right", "inner", "outer", etc. is merely for convenient and brief description of the present application, rather than indicating or implying that an indicated apparatus or element needs to have a particular orientation or be constructed and operated in a particular orientation, and therefore cannot be construed as limiting the present application. In addition, the terms "first", "second", "third", etc. are merely for the purpose of description, and shall not be construed as indicating or implying relative importance. "Perpendicular" is not necessarily perpendicular in the strict sense, and a range of errors is allowed. "Parallel" is not necessarily parallel in the strict sense, and a range of errors is allowed.

The orientation terms in the following description all indicate directions shown in the drawings, and do not impose a limitation on a specific structure in the present application. In the description of the present application, it should further be noted that, the term "mount", "engage", and "connect" should be interpreted in the broad sense unless explicitly defined and limited otherwise, which, for example, may mean a fixed connection, a detachable connection or an integral connection; or may mean a direct connection, or an indirect connection by means of an intermediary. For those of ordinary skill in the art, specific meanings of the foregoing terms in the present application may be understood in specific circumstances.

In order to clearly describe the various orientations in the following embodiments, the various directions are defined below. Taking a coordinate system of FIG. 4 as an example, a first direction X is located within a plane perpendicular to a height direction of a battery 200. For example, the first direction X represents a length direction of the battery 200. A second direction Y is also located within the plane perpendicular to the height direction of the battery 200, and is perpendicular to the first direction X. For example, the second direction Y represents a width direction of the battery 200. A third direction Z is perpendicular to the plane formed by the first direction X and the second direction Y. For example, the third direction Z represents the height direction of the battery 200.

In the accompanying drawings, the figures are not drawn to scale.

LIST OF REFERENCE NUMERALS

100. Vehicle; 101. Axle; 102. Wheel; 103. Motor; 104. Controller;

200. Battery; 211. Housing; 212. Electrode assembly; 213. Connecting portion; 214. Adapter; 215. End cap; 215A. End cap body; 215B. Positive terminal; 215C. Negative terminal; 215D. Explosion-proof valve;

1. Case assembly; 11. Case; 12. Fixed beam;

2. Battery module; 21. Battery cell;

3. First restraining component; 31. First limiting portion; 32. First mounting portion; 321. First mounting hole; 322. First positioning hole;

4. Second restraining component; 41. Second limiting portion; 411. Longitudinal restraining bar; 412. Transverse restraining bar; 413. Weak area; 42. Second mounting portion; 421. Second mounting hole; 422. Second positioning hole;

5. Outer cover;

6. Fastener;

S. Side surface; B1. First side edge; B2. Second side edge; X. First direction; Y. Second direction; and Z. Third direction In embodiments other than that in FIG. 4, the first direction X may also represent the width direction of the battery 200, and the second direction may represent the length direction of the battery 200; or the first direction X represents any direction located within the plane perpendicular to the height direction of the battery 200.

On the basis of such orientation definitions, the description of the orientations or positional relationships indicated by the terms "upper", "lower", "top", "bottom", "front", "rear", "inner", "outer", etc. are merely for convenient description of the present application, rather than indicating or implying that a device referred to needs to have a particular orientation or be constructed and operated in a particular orientation, and therefore cannot be construed as limiting the scope of protection of the present application.

As part of the invention and innovation process of the present application, through numerous tests and verifications, the inventors have found that the reasons for the low reliability and short service life of the battery may be as follows.

For a battery in which a plurality of battery cells are placed flat in a case, an expansion surface of each battery cell is restrained by a bottom plate and a top plate of the case, and is less restrained and prone to expansion compared with a battery having battery cells placed vertically. When a core inside the battery cell expands to a certain extent (e.g., 16%), a structural member of the battery may be deformed or failed due to an excessive stress. Moreover, the top plate and the expansion surface of the battery cell have inconsistent degrees of deformation, resulting in serious debonding of bonding surfaces between the battery cell and the top plate, and weakening a restraining effect of the top plate on the battery cell, which may cause the battery cell to shake in the case, or cause deformation or failure of the structural member of the battery due to an excessive stress. Moreover, if some of the battery cells have a larger degree of expansion, the top plate as a whole will be forced to arch and deform, the restraining effect on the other battery cells will be affected, and the top plate has a poor ability to deform along with the battery cells.

In the case where the top plate is thickened, although a restraining force of the top plate to the battery cells can be increased, the energy density of the battery may be reduced. Therefore, there is a need for a more effective method to improve the restraining effect on the battery cells.

A battery may be used in a power consuming device, and the battery is configured to supply electric energy to the power consuming device. The power consuming device may be, for example, a mobile phone, a portable apparatus, a laptop, an electric motorcycle, an electric vehicle, a ship, a spacecraft, an electric toy, or an electric tool. For example, the spacecraft includes an airplane, a rocket, a space shuttle, or a spaceship. The electric toy includes a fixed or mobile electric toy, such as a game console, an electric vehicle toy, an electric ship toy, and an electric airplane toy. The electric tool includes an electric tool for metal cutting, an electric tool for grinding, an electric tool for assembling and an electric tool for railways, such as an electric drill, an electric grinder, an electric wrench, an electric screwdriver, an electric hammer, an electric impact drill, a concrete vibrator, and an electric planer.

As shown in FIG. 1, the power consuming device may be a vehicle 100, for example, a new energy vehicle. The new energy vehicle may be a battery electric vehicle, a hybrid electric vehicle, an extended-range electric vehicle, or the like. Alternatively, the power consuming device may be an unmanned aerial vehicle, a ship, or the like. The vehicle 100 includes a battery 200. The battery 200 is configured to supply electric energy for the operation of the vehicle.

The vehicle 100 further includes axles 101, wheels 102 connected to the axles 101, a motor 103 and a controller 104. The motor 103 is configured to drive the axle 101 to rotate, the controller 104 is configured to control the operation of the motor 103, and the battery 200 is configured to supply electric energy for the operation of the motor 103 and other components in the vehicle.

Figure 2:
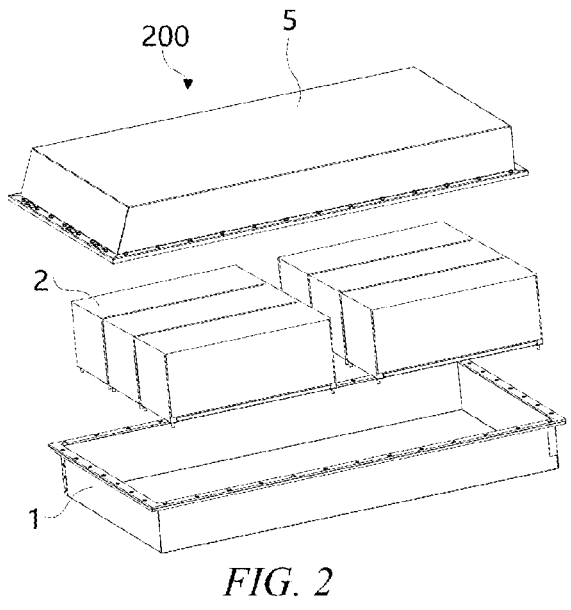
FIG. 2 is a schematic structural diagram of a battery according to some embodiments of the present application.

As shown in FIG. 2, the battery 200 may include a case assembly 1, a battery module 2 and an outer cover 5. The interior of the case assembly 1 is of a hollow structure, and the battery module 2 is received in the case assembly 1. The case assembly 1 is configured to provide a receiving space for the battery module 2. In some embodiments, the outer cover 5 and the case assembly 1 are covered by each other to define a receiving space for receiving the battery module 2. Of course, a connection between the case assembly 1 and the outer cover 5 may be sealed by a sealing member (not shown in the figures). The sealing member may be a sealing ring, a sealant or the like.

One or more battery cells 21 may be arranged in the battery module 2. If a plurality of battery cells 21 are provided, the plurality of battery cells 21 may be connected in series, in parallel or in a hybrid connection. The hybrid connection means that some of the plurality of battery cells 21 are connected in series and some are connected in parallel. The battery cell 21 may be a secondary battery in the shape of a cylinder, a square or in other shapes.

Figure 3:
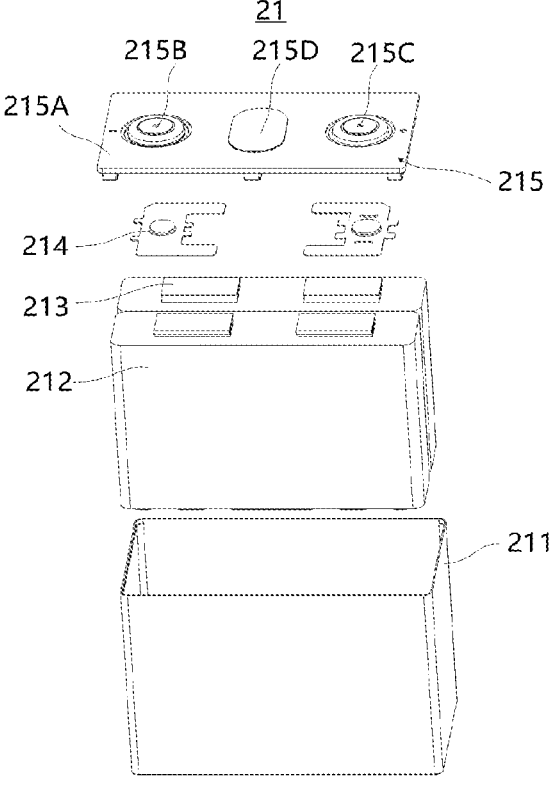
FIG. 3 is an exploded view of a battery cell in a battery according to some embodiments of the present application.

As shown in FIG. 3, the battery cell 21 may include a housing 211, an electrode assembly 212 and an end cap 215. The housing 211 has an opening, the electrode assembly 212 is received in the housing 211, and the end cap 215 is configured to close the opening of the housing 211. The end cap 215 includes an end cap body 215A, and a positive terminal 215B, a negative terminal 215C and an explosion-proof valve 215D which are arranged on the end cap body 215A. One or more electrode assemblies 212 may be arranged in a stacking manner. Each electrode assembly 212 is provided with two connecting portions 213, and the two connecting portions 213 are connected to the positive terminal 215B and the negative terminal 215C via adapters 214.

The electrode assembly 212 may include a positive electrode plate, a negative electrode plate (not shown in the figures) and a separator (not shown in the figures). The electrode assembly 212 may be of a winding structure formed by winding the positive electrode plate, the separator and the negative electrode plate, or a laminated structure formed by laminating the positive electrode plate, the separator film and the negative electrode plate. The electrode assembly 212 also includes a positive electrode tab and a negative electrode tab. A positive electrode current collector in the positive electrode plate that is not coated with a positive electrode active material layer may be used as the positive electrode tab, and a negative electrode current collector in the negative electrode plate that is not coated with a negative electrode active material layer may be used as the negative electrode tab.

Figures 4, 5:
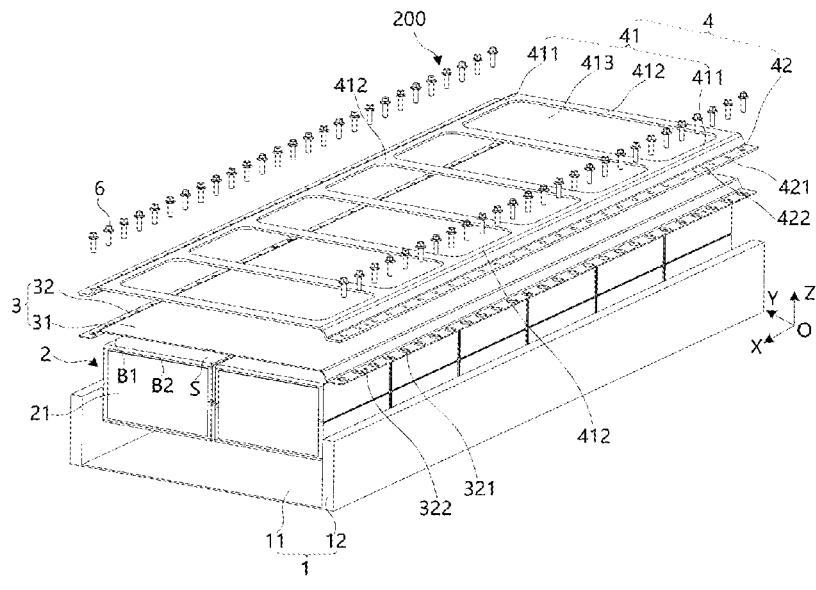
FIG. 4 is an exploded view of an internal structure of a battery according to some embodiments of the present application.
FIG. 5 is a schematic diagram of an internal structure of a battery according to some embodiments of the present application.

In some embodiments, as shown in FIG. 4, the present application provides a battery 200, which includes a case assembly 1, a battery module 2, a first restraining component 3, and a second restraining component 4. The case assembly 1 includes a case 11 and fixed beams 12 fixed in the case 11. The battery module 2 is arranged in the case 11, and the battery module 2 includes a plurality of battery cells 21. The first restraining component 3 is configured to cover the battery module 2 and fixed to the fixed beams 12. The second restraining component 4 is located on the side of the first restraining component 3 away from the battery module 2 and fixed to the fixed beams 12. The second restraining component 4 is provided with a weak area 413, and the second restraining component 4 is configured to apply a restraining force to the first restraining component 3 and to allow expansion of the battery cells 21 in the weak area 413.

For example, the fixed beams 12 may be arranged in the first direction X. The first direction X may be for example a length direction or a width direction of the battery 200. A plurality of fixed beams 12 may be arranged at intervals in the second direction Y, and the first restraining component 3 is fixed by means of two adjacent fixed beams 12. The fixed beams 12 each may be a solid fixed beam or a hollow fixed beam, its cross section may be rectangular, trapezoidal or C-shaped, etc., and its upper surface may be provided as a flat surface, so that the first restraining component 3 and the second restraining component 4 are fixed to upper surfaces of the fixed beams 12, or the first restraining component 3 and the second restraining component 4 may be fixed to side surfaces of the fixed beams 12.

For example, the plurality of battery cells 21 may be arranged in one or more layers, and each layer of battery cells 21 includes one column or multiple columns of battery cells 21 arranged side-by-side in the second direction Y, and each column of battery cells 21 includes a plurality of battery cells 21 which are arranged side-by-side in the first direction X. The positive electrode plate and the negative electrode plate in the battery cell 21 are stacked in the third direction Z, and accordingly the battery cell 21 is prone to expansion in the third direction Z.

For example, in order to improve the restraining effect, a bonding layer is provided between the first restraining component 3 and the battery module 2. For example, glue or another adhesive material is used for bonding.

According to some embodiments of the present application, the second restraining component 3 is arranged outside the first restraining component 4, and the second restraining component 4 can be used to apply a restraining force to the first restraining component 3, so that the first restraining component 3 and the second restraining component 4 can be jointly used to apply a restraining force to the battery module 2; moreover, the second restraining component 4 is provided with the weak area 413, and on the basis that expansion of the battery cells 21 is allowed in the weak area 413, a restraining force to an expansion surface of each battery cell 21 can be increased, so that an expansion rate of the battery cell 21 is increased, failure of the battery 200 caused by severe deformation or breakage of the first restraining component 3 and other structural members due to excessive expansion of the battery cell 21 can be avoided, thereby improving the reliability and prolonging the service life of the battery 200 in operation.

Secondly, the restraining force on the battery cell 21 is increased by adding the second restraining component 4, and the housing 211 of the battery cell 21 is allowed to be thinned, thereby increasing the energy density of the battery cell 21.

Thirdly, in the case where a bonding layer is provided between the first restraining component 3 and the battery module 2, the degree of debonding of the bonding layer between the first restraining component 3 and the battery module 2 can also be reduced by improving the degree of expansion of the battery cell 21, so as to ensure the restraining force of the first restraining component 3 on the battery cell 21, improve the structural strength of the battery 200, and prevent the failure of the battery 200, thereby improving the reliability and prolonging the service life of the battery 200 in operation.

In some embodiments, as shown in FIG. 5, the second restraining component 4 and the first restraining component 3 are stacked in the third direction Z. The second restraining component 4 may be arranged in contact with the first restraining component 3.

According to some embodiments, it is possible for the second restraining component 4 to provide a restraining force to the first restraining component 3 more stably and effectively, and it is easy to provide the weak area 413 at the position of the second restraining component 4 corresponding to the expansion regions of the battery cells 21, so that on the basis that the expansion of the battery cells 21 is allowed in the weak area 413, the restraining force on the expansion surface of each battery cell 21 is increased.

In some embodiments, the battery cell 21 includes an electrode assembly 212, and the weak area 413 is arranged corresponding to a region where the electrode assembly 212 is located. Since the battery cell 21 expands mainly at the position where the electrode assembly 212 is located, the weak area 413 is provided at the position corresponding to the electrode assembly 212, on the basis that the restraining force of the second restraining component 4 to the expansion surface of the battery cell 21 is increased, an expansion space of the electrode assembly 212 occupied by the second restraining component 4 can be minimized while the second restraining component provides the restraining force, without affecting an expansion gap of the electrode assembly 212.

Further, the weak area 413 completely covers the electrode assembly 212, and a part of the second restraining component 4 outside the weak area 413 completely keeps clear of the region where the electrode assembly 212 is located, so that the restraining force to the expansion surface of the battery cell 21 can be increased through the second restraining component 4, and occupation of the expansion space of the electrode assembly 212 by the second restraining component 4 can be avoided while the second restraining component provides the restraining force.

In some embodiments, as shown in FIG. 4, the weak area 413 is provided in a penetrating manner in a thickness direction of the second restraining component 4.

In some embodiments, with the arrangement of the weak area 413 penetrating the second restraining component 4, the restraining force on the battery cell 21 is ensured while reduction of the influence of the arrangement of the second restraining component 4 on the expansion of the battery cell 21 is facilitated, so that an expansion space is provided for each battery cell 21, thereby improving the reliability and prolonging the service life of the battery 200 in operation. Optionally, the weak area 413 may also be a portion with a reduced thickness, or the weak area 413 has a material strength smaller than that of other regions of the second restraining component 4 except the weak area 413.

Figure 6:
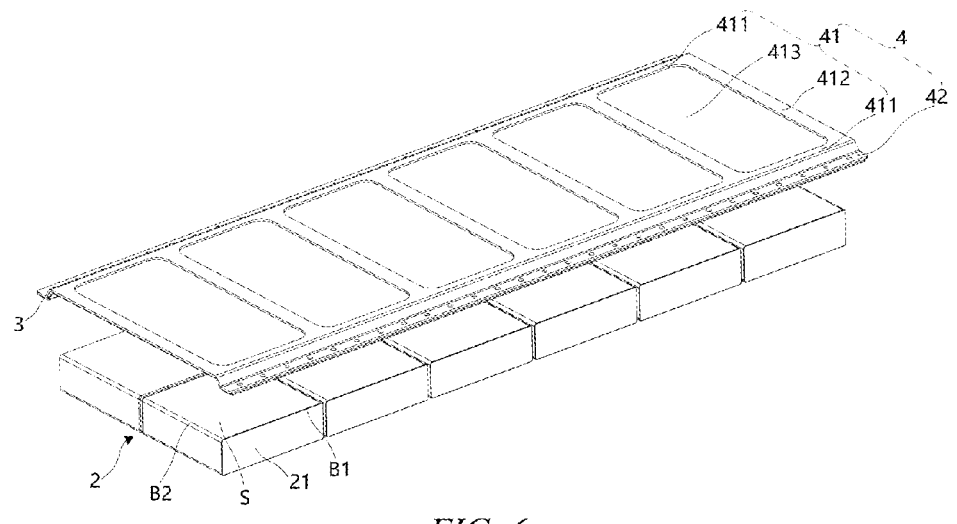
FIG. 6 is a schematic diagram showing a mounting relationship of a first restraining component, a second restraining component, and a battery module of a battery according to some embodiments of the present application.

In some embodiments, as shown in FIGS. 4 and 6, each battery cell 21 has a side surface S facing the first restraining component 3. The side surface S is perpendicular to the third direction Z, and the side surface S has four side edges. The second restraining component 4 applies a restraining force to the first restraining component 3 on at least some of the side edges of the side surface S.

In some embodiments, since the restraining force on the side edges of the battery cell 21 is increased by means of the second restraining component 4, the restraining force on the battery cell 21 can be increased without affecting the expansion space of the battery cell 21, and the failure of the battery 200 caused by severe deformation or breakage of the first restraining component 3 and other structural members due to excessive expansion of the battery cell 21 can be avoided, thereby improving the reliability and prolonging the service life of the battery 200 in operation.

In some embodiments, as shown in FIGS. 4 and 6, the first restraining component 3 includes a first limiting portion 31 configured to cover the battery module 2, and the second restraining component 4 includes a second limiting portion 41 which is stacked on an outer side of the first limiting portion 31. The battery module 2 includes a plurality of battery cells 21 which are arranged in the first direction X, and the four side edges include a second side edge B2 extending in a second direction Y. The second direction Y is perpendicular to the first direction within the side surface S, and the second side edge B2 is perpendicular to the end cap 215. The second limiting portion 41 includes a transverse restraining bar 412. The transverse restraining bar 412 is configured to apply a restraining force to the second side edge B2.

In some embodiments, the transverse restraining bar 412 can be used to apply a stable restraining force to the second side edge B2 of each battery cell 21, without occupying the expansion space of the battery cell 21 nor affecting the energy density of the battery cell 21, thereby ensuring power supply. In addition, the expansion of adjacent battery cells 21 can be prevented from interfering with each other. Furthermore, in the case where a bonding layer is provided between the first restraining component 3 and the battery module 2, a region between the adjacent battery cells 21 is a position where the bonding layer is most likely to be debonded. With the restraining force applied by the transverse restraining bar 412, the phenomenon that the bonding layer between the first restraining component 3 and the battery module 2 is debonded can be alleviated, to further ensure the restraining force applied to the battery cells 21, improve the structural strength of the battery 200, and prevent the failure of the battery 200, thereby improving the reliability and prolonging the service life of the battery 200 in operation.

In some embodiments, as shown in FIG. 6, adjacent second side edges B2 of the battery cells 21 adjacent to each other in the first direction X are restrained by a restraining force from the same transverse restraining bar 412.

According to some embodiments, the structure of the second restraining component 4 can be simplified, and a more stable restraining force can be provided by the same transverse restraining bar 412 to the adjacent battery cells 21.

In some embodiments, the four side edges further include a first side edge B1 extending in the first direction X, and the second limiting portion further 41 includes two longitudinal restraining bars 411 arranged apart from each other in the second direction Y and both extending in the first direction X. The longitudinal restraining bars 411 are configured to apply a restraining force to the first side edge B1. The transverse restraining bar 412 is located between the two longitudinal restraining bars 411, and two ends of the transverse restraining bar 412 are respectively connected to the two longitudinal restraining bars 411.

In some embodiments, with the arrangement of the two longitudinal restraining bars 411, a stable restraining force can be created on the first side edge B1 of each battery cell 21, without occupying the expansion space of the battery cell 21 nor affecting the energy density of the battery cell 21, thereby ensuring power supply. Moreover, a frame structure may be formed between the two longitudinal restraining bars 411 and the transverse restraining bar 412 to improve the overall rigidity of the second restraining component 4, so as to more effectively apply a pressure to the first restraining component 3, without affecting the expansion space of the battery cell 21 on the basis of providing a reliable restraint to the battery cell 21, thereby improving the reliability and prolonging the service life of the battery 200 in operation.

In the case where the end cap 215 of the battery cell 21 is arranged outward in the second direction Y, the first side edge B1 is a side edge of the end cap 215, and the head of the battery cell 21 is restrained by the longitudinal restraining bars 411, so that the reliability of a high-pressure connection structure can be improved. Alternatively, in the case where the end cap 215 of the battery cell 21 is arranged inward in the second direction Y, the first side edge B1 is a side edge of a surface of the housing 211 that is opposite the end cap 215.

Figure 7:
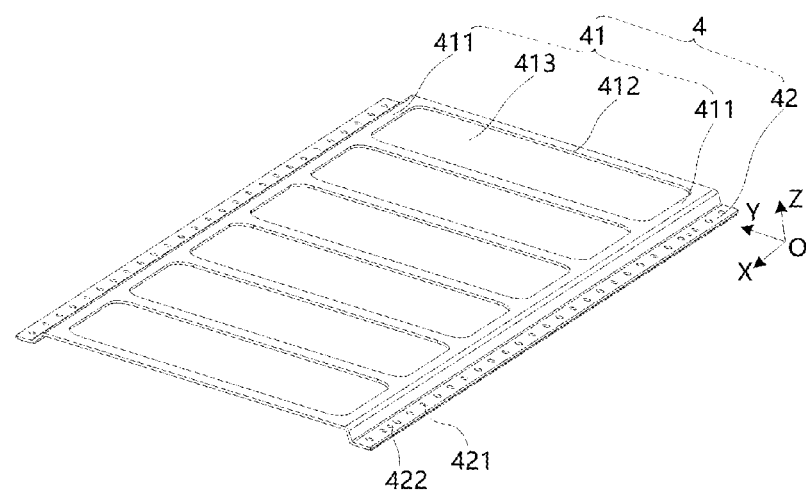
FIGS. 7, 8, and 9 are respectively a perspective view, a top view, and a side view of a combination of a first restraining component and a second restraining component of a battery according to some embodiments of the present application.
Figure 8:
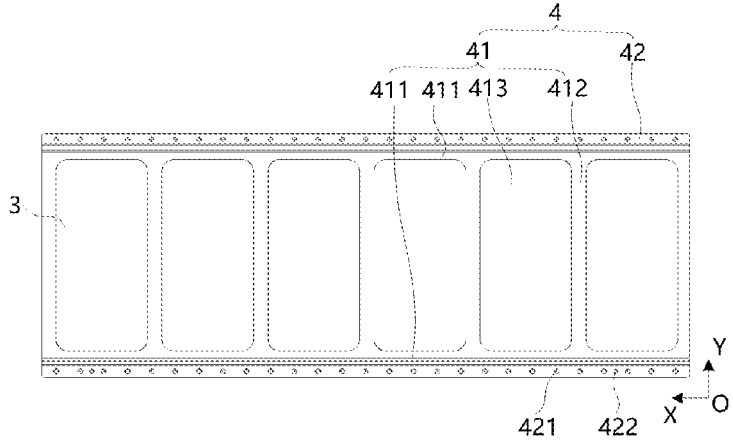

In some embodiments, as shown in FIGS. 7 and 8, the second limiting portion 41 includes a plurality of transverse restraining bars 412, and a region enclosed by adjacent transverse restraining bars 412 and the two longitudinal restraining bars 411 forms the weak area 413. The weak area 413 is a rectangular slot. In order to reduce a stress on the second restraining component 4, four corners of the weak area 413 may be rounded or chamfered, for example. Thanks to such a structure, a weak area 413 having a larger area can be formed to keep clear of the expansion region of the battery cell 21. Moreover, this structure is simple and easy to process.

In some embodiments, as shown in FIGS. 4 and 5, the fixed beams 12 are arranged on two sides of the battery module 2 in the second direction Y. The first restraining component 3 includes a first limiting portion 31 and two first mounting portions 32. The first limiting portion 31 is configured to cover the battery module 2, and the two first mounting portions 32 are respectively connected to two sides of the first limiting portion 31 in the second direction Y. The second restraining component 4 includes a second limiting portion 41 and two second mounting portions 42. The second limiting portion 41 is stacked on an outer side of the first limiting portion 31, and the two second mounting portions 42 are respectively connected to two sides of the second limiting portion 41 in the second direction Y. The first limiting portion 31 and the second limiting portion 41 on the same side are fixed to the same fixed beam 12.

For example, the first restraining component 3 and the second restraining component 4 may be formed by a sheet metal stamping process.

As shown in FIGS. 4, 7 and 8, each of the two first mounting portions 32 is provided with a plurality of first mounting holes 321 at intervals in an extending direction of the corresponding fixed beam 12. Each of the two second mounting portions 42 is provided with a plurality of second mounting holes 421 at intervals in the extending direction of the corresponding fixed beam 12. Each fixed beam 12 is provided with a plurality of third mounting holes at intervals in its own extending direction. A plurality of fasteners 6 respectively pass through the corresponding first mounting holes 321, second mounting holes 421 and third mounting holes to mount the first restraining component 3 and the second restraining component 4 to the fixed beams 12. For example, the fasteners 6 may be screws, bolts, rivets or the like. In order to improve the positioning accuracy of the first restraining component 3 and the second restraining component 4, the first mounting portions 32 may be provided with first positioning holes 322, and the second mounting portions 42 may be provided with second positioning holes 422, so that the first restraining component and the second restraining component are positioned with pins before being fixed with the fasteners 6.

In the battery 200 according to some embodiments, the first restraining component 3 and the second restraining component 4 are fixed to the fixed beams 12 by means of the same group of fasteners 6, which facilitates the assembly. In addition, when the battery module 2 expands, a stable and effective pressing force can be provided to each battery module 2 to reduce the degree of expansion deformation of the battery module 2.

Figure 9:
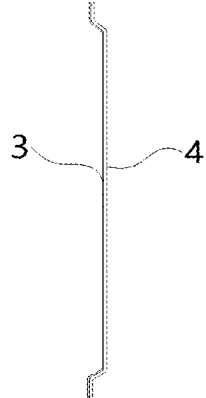

In some embodiments, as shown in FIG. 9, the first limiting portion 31 as a whole protrudes toward the side away from the battery module 2 relative to the first mounting portions 32, and the second limiting portion 41 as a whole protrudes toward the side away from the battery module 2 relative to the second mounting portions 42.

According to some embodiments, the height of each fixed beam 12 can be reduced to ensure the strength of the fixed beam 12. Moreover, when the first mounting portion 32 and the second mounting portion 42 are fixed to the corresponding fixed beam 12 via the fasteners 6, the fasteners 6 can be prevented from protruding from a top surface of the second limiting portion 41, so that the height of the battery 200 can be reduced. Furthermore, the overall rigidity of the first restraining component 3 and the second restraining component 4 can be improved.

As shown in FIG. 2, the battery 200 further includes an outer cover 5 arranged on the side of the second restraining component 4 away from the first restraining component 3, and configured to close an opening end of the case 11.

In some embodiments, since the battery module 2 is restrained by the first restraining component 3 and the second restraining component 4, deformation of the outer cover 5 can be reduced, and the sealing performance of the battery can be improved. Moreover, since the deformation of the outer cover 5 is reduced with the arrangement of the first restraining component 3 and the second restraining component 4, when the battery 200 is used in a vehicle, the battery can still be smoothly disassembled at the original installation position after long-term use, which can reduce the maintenance difficulty of the battery 200, and can also prevent the application of an external force to a mounting structure on the vehicle due to deformation of the battery 200.

In some embodiments, as shown in FIG. 9, the thickness of the second restraining component 4 except the weak area 413 is greater than the thickness of the first restraining component 3. With the arrangement of the second restraining component 4 with a larger thickness, a more stable and reliable restraining force can be applied to the battery cells 21 by means of the first restraining component 3. With the arrangement of the first restraining component 3 with a smaller thickness, the battery cells 21 are more prone to expansion against a pressing force of the first restraining component 3 in the weak area 413, thereby improving the reliability and prolonging the service life of the battery 200 in operation.

A specific embodiment of the battery 200 of the present application is given below with reference to FIGS. 4 to 9.

A plurality of fixed beams 12 are arranged in the case 1 in the second direction Y. The battery module 2 is arranged between adjacent fixed beams 12. The first restraining component 3 is configured to cover the battery module 2 and is fixed to the fixed beams 12 on two sides. The second restraining component 4 is located on the side of the first restraining component 3 away from the battery module 2 and is fixed to the fixed beams 12. The first restraining component 3 and the second restraining component 4 may be fixed by means of the same group of fasteners 6.

The battery module 2 includes at least two columns of battery cells 21 arranged side-by-side in the second direction Y. Each column of battery cells 21 includes at least two layers of battery cells 21, and each layer of battery cells 21 includes a plurality of battery cells 21 arranged side-by-side in the first direction X. The battery cells 21 in the at least two columns of battery cells 21 are aligned in the first direction X. Each battery cell 21 is placed flat in the case 11. The positive electrode plate and the negative electrode plate are stacked with each other in the electrode assembly 212 in the third direction Z, and the electrode assembly 212 expands mainly in the third direction Z. The side surface S of the battery cell 21 is perpendicular to the third direction Z, and the side surface S is also the largest surface of the battery cell 21.

The first restraining component 3 covers the battery module 2 as a whole and is fixed to the fixed beams 12. The second restraining component 4 is stacked on the first restraining component 3, is located on the side of the first restraining component 3 away from the battery module 2, and is fixed to the fixed beams 12. The second limiting portion 41 is in contact with the first limiting portion 31 to provide a pressing force. A bonding layer may be provided between the first restraining component 3 and the top layer of battery cells 21, and a bonding layer may also be provided between the second restraining component 4 and the first restraining component 3, so that the pressing effect of the second restraining component 4 on the first restraining component 3 is improved.

The second limiting portion 41 of the second restraining component 4 includes two longitudinal restraining bars 411 and a plurality of transverse restraining bars 412.

The two longitudinal restraining bars 411 are spaced apart from each other in the second direction Y and both extend in the first direction X. The two longitudinal restraining bars 411 are respectively configured to restrain first side edges B1 of the side surfaces S of the two outermost columns of battery cells 21. The first side edge B1 is located on the outer side of the corresponding battery cell 21. An extension length of each longitudinal restraining bar 411 covers the first side edges B1 of the entire column of battery cells 21.

A plurality of transverse restraining bars 412 are arranged at intervals in the first direction X and all extend in the second direction Y, and two ends of each transverse restraining bar 412 are respectively connected to the two longitudinal restraining bars 411. The two outermost transverse restraining bars 412 are respectively used for restraining the second side edges B2 of the two outermost battery cells 21 in the first direction X. The remaining transverse restraining bars 412 respectively restrain the second side edges B2 of the adjacent battery cells 21 in the first direction X. An extension length of the transverse restraining bar 412 covers the total dimension of the at least two columns of battery cells 21 in the second direction Y. By arranging the transverse restraining bars 412 at the second side edges B2 of the adjacent battery cells 21, it is also possible to prevent the expansion of the battery cells 21 from affecting the adjacent battery cells 21.

The weak area 413 is formed between the two longitudinal restraining bars 411 and the plurality of transverse restraining bars 412. The weak area 413 is a slot penetrating the second restraining component 4 in the third direction Z. The arrangement region of the slot may correspond to the electrode assembly 212, so that both the longitudinal restraining bars 411 and the transverse restraining bars 412 keep clear of the electrode assembly 212 to leave a space for the expansion of the electrode assembly 212. The widths of the longitudinal restraining bars 411 and the transverse restraining bars 412 can be designed according to the size of the electrode assembly 212. For example, a width range thereof may be designed as 2 mm to 20 mm, and a thickness range may be designed between 0.5 mm to 6 mm.

According to this embodiment, restraining forces can be provided for one first side edge B1 and two second side edges B2 of the side surface S of the battery cell 21 that is opposite the first restraining component 3, so as to achieve a better restraining effect. Optionally, a longitudinal restraining bar 411 may also be additionally provided between two adjacent columns of battery cells 21 to provide a restraining force to all the four side edges of the side surface S of each battery cell 21, thereby achieving a better restraining effect.

Although the present application is described with reference to the preferred embodiments, various improvements may be made thereto, and the components thereof may be replaced with equivalents, without departing from the scope of the present application. In particular, the technical features mentioned in some embodiments can be combined in any manner as long as there is no structural conflict. The present application is not limited to specific embodiments disclosed herein, but includes all technical solutions that fall within the scope of the claims.

The invention claimed is:

1. A battery, comprising:
a case assembly, comprising a case and fixed beams fixed in the case;
a battery module, arranged in the case and comprising a plurality of battery cells;
a first restraining component, configured to cover the battery module and fixed to the fixed beams; and
a second restraining component, located on a side of the first restraining component away from the battery module and fixed to the fixed beams, wherein the second restraining component is provided with a weak area, and the second restraining component is configured to apply a restraining force to the first restraining component and to allow expansion of the battery cells in the weak area.

2. The battery according to claim 1, wherein the second restraining component and the first restraining component are stacked with each other.

3. The battery according to claim 1, wherein each one of the plurality of battery cells comprises an electrode assembly, and the weak area is arranged corresponding to a region where the electrode assembly is located.

4. The battery according to claim 1, wherein the weak area is provided in a penetrating manner in a thickness direction of the second restraining component.

5. The battery according to claim 1, wherein each one of the plurality of battery cells has a side surface facing the first restraining component, the side surface having four side edges; and
the second restraining component applies a restraining force to the first restraining component on at least some of the side edges of the side surface.

6. The battery according to claim 5, wherein the first restraining component comprises a first limiting portion configured to cover the battery module, and the second restraining component comprises a second limiting portion which is stacked on an outer side of the first limiting portion; the plurality of battery cells are arranged in a first direction, and the four side edges comprise a second side edge extending in a second direction, the second direction being perpendicular to the first direction within the side surface,
wherein the second limiting portion comprises a transverse restraining bar, the transverse restraining bar being configured to apply a restraining force to the second side edge.

7. The battery according to claim 6, wherein adjacent second side edges of the battery cells adjacent to each other in the first direction are restrained by a restraining force from the same transverse restraining bar.

8. The battery according to claim 6, wherein the four side edges further comprise a first side edge extending in the first direction, and the second limiting portion further comprises two longitudinal restraining bars arranged apart from each other in the second direction and both extending in the first direction, the longitudinal restraining bars being configured to apply a restraining force to the first side edge,
wherein the transverse restraining bar is located between the two longitudinal restraining bars, and two ends of the transverse restraining bar are respectively connected to the two longitudinal restraining bars.

9. The battery according to claim 8, wherein the second limiting portion comprises a plurality of transverse restraining bars, and a region enclosed by adjacent transverse restraining bars and the two longitudinal restraining bars forms the weak area.

10. The battery according to claim 1, wherein the fixed beams are arranged on two sides of the battery module in the second direction;
the first restraining component comprises a first limiting portion and two first mounting portions, the first limiting portion being configured to cover the battery module, and the two first mounting portions being respectively connected to two sides of the first limiting portion in the second direction; and
the second restraining component comprises a second limiting portion and two second mounting portions, the second limiting portion being stacked on an outer side of the first limiting portion, and the two second mounting portions being respectively connected to two sides of the second limiting portion in the second direction;
wherein the first limiting portion and the second limiting portion on the same side are fixed to the same fixed beam.

11. The battery according to claim 10, wherein the first limiting portion as a whole protrudes toward the side away from the battery module relative to the first mounting portions, and the second limiting portion as a whole protrudes toward the side away from the battery module relative to the second mounting portions.

12. The battery according to claim 1, further comprising:
an outer cover arranged on the side of the second restraining component away from the first restraining component, and configured to close an opening end of the case.

13. A power consuming device, comprising a battery according to claim 1, wherein the battery is configured to supply electric energy to the power consuming device.

* * * * *